Patented Mar. 10, 1953

2,631,107

UNITED STATES PATENT OFFICE 2,631,107

PROCESS OF PREPARING CARBON BLACK CONTAINING SUBSTANTIAL AMOUNTS OF SULFUR

Gerald T. Leatherman, Bartlesville, Okla., assignor to Phillips Petroleum Company, a corporation of Delaware No Drawing. Application December 15, 1950, Serial No. 201,065

7 Claims. (Cl. 106—307)

This invention relates to a process for the preparation of a carbon black. In another of its aspects, it relates to the preparation of a carbon black which contains sulfur by the treatment of a hydrocarbon with sulfur dioxide in the presence of hydrofluoric acid as a catalyst.

One of the common methods for preparing carbon black is by burning organic substances in a flame, and typical of such methods are the well known furnace process and the channel process. These processes produce a material which is substantially pure carbon black and contains only small amounts of other materials.

According to this invention, it has now been found that a carbon black can be prepared by heating a carbon-containing organic compound, such as a hydrocarbon, with sulfur dioxide in the presence of hydrogen fluoride as the sole catalyst. By means of such reaction, high yields of carbon black containing substantial amounts of sulfur are accomplished. It is indeed astonishing that such reaction will occur because sulfur dioxide is ordinarily a reducing agent whereas in the instant process it acts as an oxidizing agent.

It is an object of this invention to provide a process for the preparation of carbon black.

Another object of this invention is to provide a process for the preparation of carbon black containing a substantial amount of sulfur.

Still another object of this invention is to provide a process for the preparation of carbon black wherein a normally reducing agent is employed to convert a carbon-containing organic compound to a carbon black.

In carrying out the process of this invention, a normally liquid carbon-containing compound, such as a hydrocarbon, can be passed, along with sulfur dioxide ($SO_2$) and hydrogen fluoride (HF) in suitable amounts, to an agitated reaction zone which can be a suitable reactor such as an autoclave or other closed reaction vessel equipped with a stirring apparatus, such as an impeller or propeller type mixer. At the conclusion of the reaction period, the reaction mixture can be withdrawn and passed to a separation zone wherein the unreacted materials and catalyst can be separated for recycle and the product carbon black recovered. Such separation zone can constitute a heated vessel from which hydrogen fluoride, unreacted sulfur dioxide, and unreacted organic compound can be withdrawn as a vapor. Such heated vessel should be maintained at a temperature sufficiently high to vaporize said unreacted materials and can be at a temperature within the range of 200° to 1000° F. Oxygen is preferably excluded. The hydrogen fluoride employed in the process can then be reclaimed from this vaporous effluent by fractional distillation. The carbon black product can be recovered from the remainder of the reaction mixture, if any, by filtration and washing with a suitable solvent such as a low boiling hydrocarbon, for example, butane, pentane, hexane, or the like, followed by a water wash, if desired. The washed carbon black can be dried by heating to an elevated temperature within the range of 200° to 400° F.

The carbon-containing organic compounds which can be employed in the process of this invention to produce a carbon black containing sulfur can be any hydrocarbon or hydrocarbon fraction, preferably those normally liquid, but more preferably is constituted of those hydrocarbons, either aliphatic or aromatic, which boil in the range of 400° to 800° F., still yet more preferably those hydrocarbons which are comprised predominantly (more than 50 per cent) of paraffins or cycloparaffins boiling within the above range or admixtures thereof. For example, the liquid hydrocarbon can be a gas oil fraction or can constitute a mixture of a gas oil fraction and such cycloparaffins as the cyclohexanes, cyclopentanes and cyclooctanes. Although hydrocarbons are the preferred reactants for forming the sulfur-containing carbon black of this invention, oxygen-containing compounds of the same series, such as alcohols, carboxylic acids, and the like, are also useful.

The amount of sulfur dioxide employed is within the range of 0.2 to 10, preferably from 0.5 to 3, parts by weight per part by weight of the hydrocarbon charged. The optimum amount of sulfur dioxide employed in conjunction with any particular hydrocarbon or other carbon-containing organic compound can be determined by mere routine test. The sulfur dioxide can be added to the carbon-containing organic compound feed or to the reaction zone as a liquid or a vapor.

The hydrogen fluoride employed as the catalyst in the carbon producing reaction is preferably substantially anhydrous. The amount employed will vary with other reaction conditions and with the particular reactant carbon-containing compound employed. However, it has been found that an amount of hydrogen fluoride within the range of 0.5 to 5, preferably from 0.6 to 2, parts by weight per part by weight of the carbon-containing compound charged will be satisfactory.

The temperature at which the carbon black producing reaction is carried out should be within the range of 300° to 450° F., preferably from 375° to 425° F. The reaction time will be dependent upon other process variables, such as the nature of the carbon-containing organic compound feed employed, the temperature maintained in the reaction zone and the amount of sulfur dioxide and hydrogen fluoride present. However, a reaction time within the range of five minutes to two hours, preferably from ten minutes to one hour, is satisfactory. The reaction pressure should be at least sufficiently high to maintain the organic compound reactant, the sulfur dioxide, and the hydrogen fluoride in a liquid phase in the reactor. Such a pressure should be within the range of atmospheric to 500, preferably 10 to 100, pounds per square inch.

The following example is illustrative of the process. In the example the parts referred to are parts by weight.

*Example*

Sulfur dioxide and hydrogen fluoride were charged to an autoclave equipped with a paddle type agitator at the rate of 1.22 parts by weight of sulfur dioxide to 1.38 parts by weight of hydrogen fluoride. The mixture was heated to a temperature of 400° F. and then 1.86 parts by weight of virgin gas oil was charged to the reactor over a period of about 13 minutes. The reaction was continued for an additional 17 minutes. Vapors were removed from the reactor and the reactor was then cooled. Upon opening thereof, 2.5 parts by weight of solid residue were removed from the reactor and extracted at room temperature with an equal volume of normal hexane. After heating to remove any residual hexane, the solid product comprising 1.75 parts by weight was analyzed and found to contain the following:

|  | Weight per cent |
|---|---|
| Carbon | 68.28 |
| Hydrogen | 7.72 |
| Sulfur | 21.00 |
| Fluorine | 0.6 |
| Residue | 2.4 |

Based upon an 87 weight per cent of carbon in the gas oil charge, the yield of carbon was 74 per cent.

While the invention has been described in connection with a present, preferred embodiment thereof, it is to be understood that this description is illustrative only and is not intended to limit the invention, the scope of which is defined by the appended claims.

I claim:

1. A process for the production of carbon black containing substantial amounts of sulfur which comprises reacting a normally liquid hydrocarbon having a boiling point within the range of 400° to 800° F. with sulfur dioxide present in an amount within the range of 0.2 to 10 parts by weight per part by weight of said hydrocarbon in the presence of a catalyst consisting of hydrogen fluoride in an amount within the range of 0.5 to 5 parts by weight per part by weight of said hydrocarbon at a temperature within the range of 300° to 450° F. and under a pressure sufficiently high to maintain liquid phase conditions.

2. The process of claim 1 wherein said hydrocarbon is comprised predominantly of a hydrocarbon selected from the group consisting of paraffins and cycloparaffins and mixtures thereof.

3. A process for the production of carbon black containing substantial amounts of sulfur which comprises reacting a normally liquid hydrocarbon with sulfur dioxide present in an amount within the range of .2 to 10 parts by weight per part by weight of said hydrocarbon in the presence of a catalyst consisting essentially of hydrogen fluoride in an amount within the range of .5 to 5 parts by weight per part by weight of said hydrocarbon at an elevated temperature, and under the pressure sufficiently high to maintain liquid phase conditions.

4. A process for the production of carbon black containing substantial amounts of sulfur which comprises reacting a normally liquid carbon-containing organic compound having a boiling point within the range of 400° to 800° F. with sulfur dioxide present in an amount within the range of 0.2 to 10 parts by weight per part by weight of said hydrocarbon in the presence of a catalyst consisting essentially of hydrogen fluoride in an amount within the range of 0.5 to 5 parts by weight per part by weight of said hydrocarbon at a temperature within the range of 300° to 450° F. and under a pressure sufficiently high to maintain liquid phase conditions, and recovering resulting carbon black.

5. The process of claim 4 wherein said hydrocarbon is comprised predominantly of a hydrocarbon selected from the group consisting of paraffins, cycloparaffins and mixtures thereof.

6. A process for the production of carbon black containing substantial amounts of sulfur which comprises reacting a normally liquid hydrocarbon having a boiling point within the range of 400° to 800° F. with sulfur dioxide present in an amount within the range of 0.5 to 3 parts by weight per part by weight of said hydrocarbon in the presence of a catalyst consisting essentially of hydrogen fluoride in an amount within the range of 0.6 to 2 parts by weight per part by weight of said hydrocarbon at a temperature within the range of 300° to 450° F. and under a pressure sufficiently high to maintain liquid phase conditions, and recovering resulting carbon black.

7. The process of claim 6 wherein said hydrocarbon is comprised predominantly of a hydrocarbon selected from the group consisting of paraffins, cycloparaffins and mixtures thereof.

GERALD T. LEATHERMAN.

REFERENCES CITED

The following references are of record in the file of this patent:

UNITED STATES PATENTS

| Number | Name | Date |
|---|---|---|
| 1,868,921 | Schmidt et al. | July 26, 1932 |
| 1,999,573 | Odell | Apr. 30, 1935 |
| 2,043,084 | Ward et al. | June 2, 1936 |
| 2,378,055 | Wiegland et al. | June 12, 1945 |
| 2,427,238 | Swart | Sept. 9, 1947 |
| 2,458,107 | Simons | Jan. 4, 1949 |